(12) United States Patent
Hofmann

(10) Patent No.: US 6,258,439 B1
(45) Date of Patent: Jul. 10, 2001

(54) ROOFING MATERIAL FOR COVERING THE ROOF OF A BUILDING WHICH COVERING MATERIAL CAN BE PLASTICALLY DEFORMED BY HAND

(75) Inventor: Karl-Heinz Hofmann, Mücke (DE)

(73) Assignee: Lafarge Braas GmbH, Oberursel (DE)

( * ) Notice: Subject to any disclaimer, the term of this patent is extended or adjusted under 35 U.S.C. 154(b) by 0 days.

(21) Appl. No.: 08/996,827

(22) Filed: Dec. 23, 1997

Related U.S. Application Data

(63) Continuation-in-part of application No. PCT/DE96/01189, filed on Jun. 27, 1996.

(30) Foreign Application Priority Data

Jun. 30, 1995 (DE) .............................................. 195 23 834

(51) Int. Cl.$^7$ ...................................................... B32B 3/24
(52) U.S. Cl. ........................... 428/138; 428/134; 428/135; 428/181; 428/182; 428/139; 428/140; 442/38; 442/45; 442/46; 442/48
(58) Field of Search .................................... 428/138, 134, 428/135, 181, 182, 139, 140; 442/38, 45, 46, 48

(56) References Cited

U.S. PATENT DOCUMENTS

| | | | |
|---|---|---|---|
| 4,287,248 | * | 9/1981 | Gessner et al. ........................ 428/137 |
| 5,002,816 | * | 3/1991 | Hofmann et al. ..................... 428/138 |
| 5,030,507 | * | 7/1991 | Mudge et al. ........................ 428/288 |
| 5,370,756 | * | 12/1994 | Buis et al. .............................. 156/71 |

FOREIGN PATENT DOCUMENTS

| | | |
|---|---|---|
| 3642063 | 7/1987 | (DE) . |
| 4333247 | 4/1995 | (DE) . |
| 0038222 * | 10/1981 | (EP) . |
| 0341343 | 11/1989 | (EP) . |
| 2184685 A * | 7/1987 | (GB) . |
| 8902798 | 6/1991 | (NL) . |
| 9528536 | 10/1995 | (WO) . |
| 9531620 | 11/1995 | (WO) . |

* cited by examiner

Primary Examiner—William P. Watkins, III
(74) Attorney, Agent, or Firm—Nils H. Ljungman & Associates

(57) ABSTRACT

A covering material which can be plastically deformed by band and extended in at least one direction. The covering material has a substrate with openings, at least the top side of which substrate has a top coating which covers the openings. To create an economical covering material for covering the gap between a planar surface and a structured surface, in particular a highly structured roof surface, the covering material can be extended in at least one direction more than 30%, can be bent perpendicular to the direction of extension, and the entire surface of which covering material can be permanently and plastically deformed in three dimensions. The top coating is of a thin flat stock and that the coated substrate is, at least in the direction opposite the direction of extension, compressed, crepe-like, by at least 25% of its original length so that the surface of the covering material exhibits irregular little corrugations.

6 Claims, 1 Drawing Sheet

ROOFING MATERIAL FOR COVERING THE ROOF OF A BUILDING WHICH COVERING MATERIAL CAN BE PLASTICALLY DEFORMED BY HAND

CONTINUING APPLICATION DATA

This application is a Continuation-In-Part application of International Application No. PCT/DE96/01189, filed on Jun. 27, 1996, which claims priority from Federal Republic of Germany Patent Application No. 195 23 834.6, filed on Jun. 30, 1995. International Application No. PCT/DE96/01189 was pending as of the filing date of the above-cited application. The U.S. was an elected state in International Application No. PCT/DE96/01189.

BACKGROUND OF THE INVENTION

1. Field of the Invention

The present invention relates to a covering material, which covering material can be plastically deformed by band and is extendable in at least one direction, having a substrate with openings and a coating on at least its top surface which covers the openings.

2. Background Information

Such covering material in the form of sheets, strips or widths is required as covering on the roof of a building, for example, to seal the gap between the surface of the roof covered with structured roofing tiles and a structure projecting out from the roof surface, such as a chimney, a window, a wall, or ventilating pipe, or also the gap between a ridge, an arris or hip, etc. In these cases, the gap between an essentially planar surface or straight edge and a three-dimensional structured surface must be covered so as to be water-tight, whereby the three-dimensional, structured surface is larger than its projection into the plane. The covering must therefore be extendable in at least that region abutting the three-dimensional, structured surface.

DE-A 36 42 063 discloses a covering material having a rib mesh embedded in polyisobutylene as a substrate. When this covering material is extended, the diamond meshes of the substrate deform, whereby the height and aperture of a mesh change in inverse proportion to one another while the lateral lengths remain the same. At the same time, the area of a mesh changes so that the embedding compound is severely deformed and, due to its elastic properties, exerts a restoring force on the rib mesh. This known covering material therefore exhibits undesirable creep, in particular following severe extension.

OBJECT OF THE INVENTION

The object of the present invention is to create an economical covering material for covering the gap between a planar surface and a structured surface, in particular a highly structured roof surface, which material can be extended in at least one direction more than 30%, can be bent perpendicular to the direction of extension, and the entire surface of which covering material can be permanently and plastically deformed in three dimensions.

SUMMARY OF THE INVENTION

To achieve this object, the present invention teaches that the top coating is of a thin flat stock and that the coated substrate is, at least in the direction opposite the direction of extension, compressed, crepe-like, by at least 25% of its original length so that the surface of the covering material exhibits irregular little corrugations.

As a result of the compression opposite the direction of extension, the covering material can easily be extended in the direction of extension to its original length. The covering material is compressed, crepe-like, by at least that length by which it is to later be extended or extendable. The covering material is preferably compressed by approximately 30–50% of its original length, so that when extended to its original length, it is about 1.5 to 2 times its as-delivered length. The covering material can therefore easily be extended up to 100% of its length, i.e. by a significantly greater amount than can known covering materials. The covering material can be compressed both vertically and horizontally, so that it can be extended in any direction.

The covering material simultaneously permits ventilation if the flat stock is air permeable. A thin non-woven or knit which breathes, permits diffusion and is hydrophobic is particularly well suited to this purpose. The crêped flat stock can easily adapt to changes in the shape and area of the individual openings without tearing.

A liquid-repellant flat stock can prevent water from penetrating the covering. This can also be achieved by an appropriate impregnation, which can also include fungicidal and flame-retardant components.

The covering material can be particularly resistant to weathering and ultraviolet radiation if the flat stock of the top coating is made of a polyacrylonitrile non-woven material, fabric or substance.

The covering material is particularly strong if the underside of the substrate also has a coating of flat stock, i.e. the substrate is coated on both sides.

The flat stock of the bottom coating can be a polyester non-woven material.

The top coating and the bottom coating can be interconnected, e.g. melted or glued together, in the area of the openings or meshes of the substrate. The substrate is thus embedded between the two coatings without being glued directly to them, allowing the coatings to slide over the ribs of the substrate.

The substrate can be in the form of a grid and made of a ductile material. Grid-like in the context of the invention means a grid with straight or corrugated ribs or a knit.

In the case of a grid with straight ribs, these should run at an angle to the direction of extension. When the material is extended, the position of the ribs can therefore be changed by changing the angle, so that the geometry of the meshes is also changed. The width decreases with increasing length.

Stated another way, where the substrate has mesh formed of substantially straight ribs, the material forming the ribs can be disposed at an angle with respect to the dimension in which the material is extendable. The form of the grid of the substrate material can be in a diamond pattern, having a first axial length in the direction to be extended, and a second axial length substantially perpendicular to the direction of the first axial length. Upon extension of the material, the first axial length can be increased, and the second axial length can thus decrease.

Because the ribs are corrugated due to the crepe-like compression, extension in one direction without affecting the perpendicular direction is possible.

A rib mesh is a very economical substrate. The present invention preferably bas a mesh aperture of approximately 10×5 mm, a rib width of approximately 0.4 mm and a sheet thickness of approximately 0.3 mm.

Aluminum, preferably soft aluminum, is recommended as the corrosion-resistant material for the substrate. If an aluminum rib mesh is used, its ductile properties can be improved by means of soft-annealing.

The covering material can form a hard cover if a hard-enable binder is used. This can be a hydraulically hardened binder or a polymerizable plastic.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is described in greater detail below with reference to the attached drawings, wherein.

DESCRIPTION OF THE PREFERRED EMBODIMENT

Figure 1:
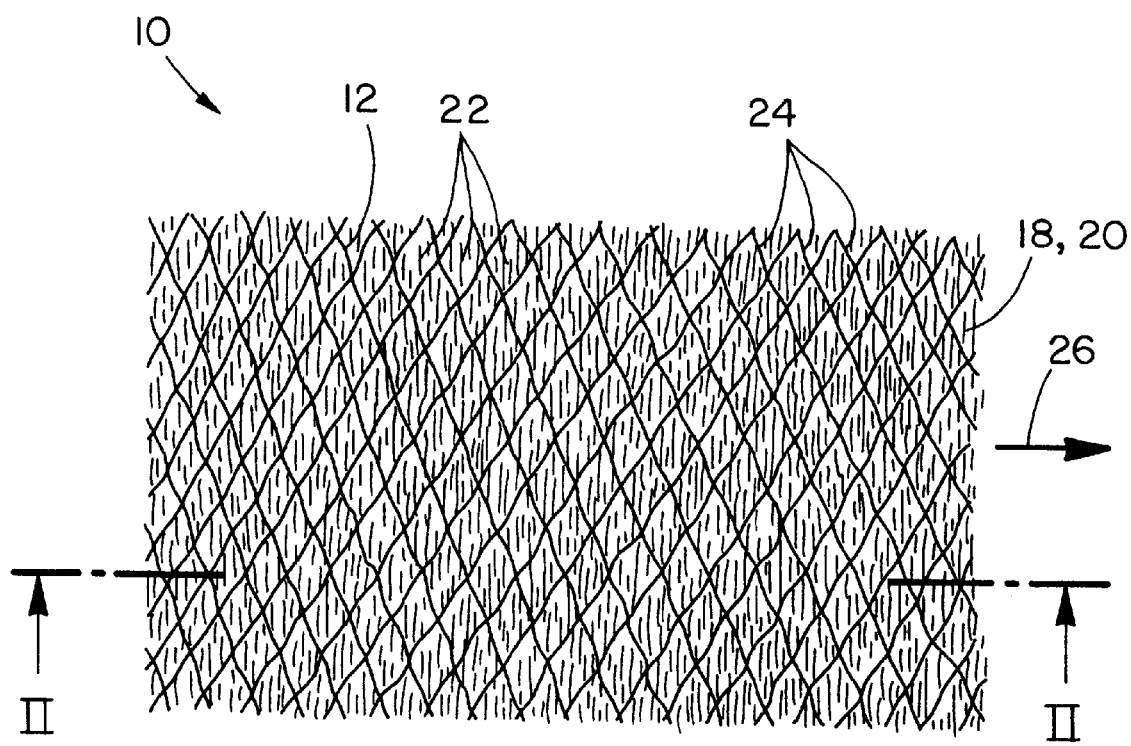
FIG. 1 shows a plan view of the covering material.
Figure 2:
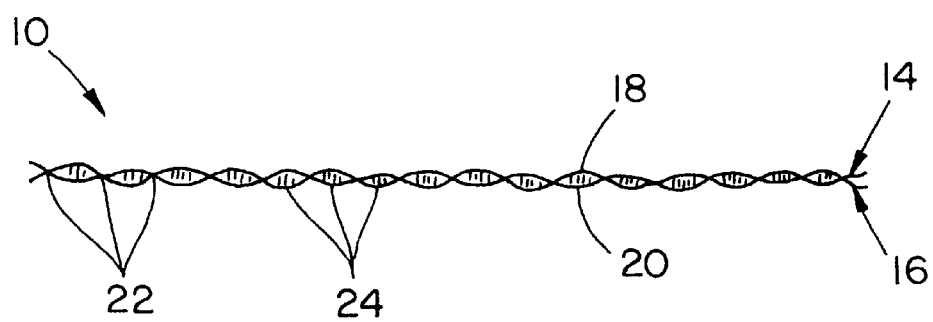
FIG. 2 shows the covering material from FIG. 1 in cross-section along the line II—II.

FIG. 1 and FIG. 2 show the covering material 10 in plan view and in cross-section, respectively. The covering material 10 preferably has a rib mesh as a substrate 12. The covering material 10 can also have a top coating 18 and a bottom coating 20 on its top 14 and bottom 16 sides, respectively, which coatings 18 and 20 can cover openings 22 in the substrate 12. The rib mesh substrate 12 can have ribs 24. The top coating 18 is of a water-repellant, impregnated polyacrylonitrile non-woven or non-woven material, while the bottom coating 20 is of a polyester non-woven material, fabric or substance. The top coating 18 can be glued, secured or attached to the bottom coating 20 in the area of the openings 22. The coatings 18, 20 can slide along the ribs 24 of the substrate 12. After gluing, the substrate 12 with coatings on both sides is compressed, crêpe-like, opposite the direction of extension 26 to about 70% of its original length so that the crêped covering material 10 can be extended by about 40% of its length.

In other words, in one embodiment of the present invention, the coated rib mesh substrate 12 can be compressed in such a way that the ribs 24 are compressed in a crepe-like manner. With such compression, the covering material 10 can later be stretched opposite the original direction of compression, with substantially no corresponding compression in the transverse direction.

One feature of the invention resides broadly in the covering material 10 which can be plastically deformed by hand and extended in at least one direction, having a substrate 12 with openings 22, at least the top side of which substrate 12 has a top coating 18 which covers the openings 22, characterized by the fact that the top coating 18 is of a thin flat stock and that the coated substrate 12 has been compressed, crêpe-like, by at least 25% of its original length in the direction opposite the direction of extension 26, so that the covering material 10 has a surface covered with irregular little corrugations.

Another feature of the invention resides broadly in the covering material characterized by the fact that the flat stock is air permeable.

Yet another feature of the invention resides broadly in the covering material characterized by the fact that the flat stock is liquid repellant.

Still another feature of the invention resides broadly in the covering material characterized by the fact that the flat stock of the upper coating 18 is a polyacrylonitrile non-woven.

A further feature of the invention resides broadly in the covering material characterized by the fact that the substrate 12 also has a bottom coating 20 of flat stock on its bottom side 16.

Another feature of the invention resides broadly in the covering material characterized by the fact that the flat stock of the bottom coating 20 is a polyester non-woven.

Yet another feature of the invention resides broadly in the covering material characterized by the fact that the top coating 18 and the bottom coating 20 are connected to one another in the area of the openings 22.

Still another feature of the invention resides broadly in the covering material characterized by the fact that the substrate 12 is a rib mesh.

A further feature of the invention resides broadly in the covering material characterized by the fact that the substrate 12 is aluminum.

Examples of roofing materials in which embodiments of the present invention may possibly be utilized may be found in the following U.S. Pat. No. 5,377,459; No. 5,379,517; No. 5,380,552; No. 5,382,449; No. 5,389,715; No. 5,395,703; No. 5,400,558; No. 5,406,764; No. 5,414,965; No. 5,415,511; No. 5,421,134; No. 5,426,898; No. 5,437,923; No. 5,438,810; No. 5,440,855; No. 5,471,801; and No. 5,474,838.

Examples of polyisobutylene materials which may possibly be used in embodiments of the present invention may be found in the following U.S. Pat. No. 5,378,779; No. 5,389,430; No. 5,416,176; No. 5,442,010; No. 5,442,015; No. 5,458,796; and No. 5,461,122.

Examples of crepe-like materials or processes for making crepe-like materials which may possibly be used in embodiments of the present invention may be found in the following U.S. Pat. No. 5,394,624; No. 5,403,446; No. 5,409,572; No. 5,417,797; No. 5,419,464; No. 5,431,786; and No. 5,468,796.

Examples of non-woven polyesters which may possibly be used in embodiments of the present invention may be found in the following U.S. Pat. No. 5,380,582; No. 5,415,738; No. 5,419,953; No. 5,429,066; No. 5,445,874; No. 5,464,096; No. 5,465,739; No. 5,470,492; and No. 5,474,838.

Examples of acroylonitrile non-woven materials which may possibly be incorporated in embodiments of the present invention may be found in the following U.S. Pat. No. 5,385,656; No. 5,385,774; No. 5,393,845; No. 5,397,627; No. 5,401,499; No. 5,401,576; No. 5,403,361; No. 5,410,053; No. 5,414,216; No. 5,418,284; No. 5,426,148; No. 5,434,205; No. 5,442,815; No. 5,443,598; No. 5,464,465; No. 5,468,529; and No. 5,470,485.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used witb at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 195 04 152.6, filed on Jun. 30, 1995 having inventor Karl-Heinz Hofmann, and DE-OS 195 04 152.6 and DE-PS 195 04 152.6 and International Application No. PCT/DE96/01189 filed on Jun. 27, 1996, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A deformable roofing material for covering the roof of a building, said roofing material comprising:
   a substrate;
   said substrate comprising a first side and a second side. disposed opposite said first side;
   said substrate comprising a plurality of openings;
   a layer of material covering substantially all of said substrate;
   said layer of material being an originally thin flat stock;
   said layer of material comprising a first side and a second side disposed opposite said first side;
   said first side of said layer of material being disposed against said first side of said substrate to cover said plurality of openings in said substrate;
   said substrate and said layer both compressed by at least 25% of their original length in a direction opposite a direction of desired extension such that said layer is a creped layer;
   said compressed creped layer having a plurality of irregular corrugations covering substantially all of said second side of said creped layer;
   said compressed substrate and said compressed creped layer with corrugations both being configured to be expandable in the direction of desired extension;
   said roofing material having a width and a length;
   said compressed substrate and said compressed creped layer with corrugations both extending substantially completely across both the width and the length of said roofing material;
   said irregular corrugations having lengths; and
   said lengths of said irregular corrugations being substantially smaller than said width of said roofing material;
   said layer of creped material comprises an air permeable compressed creped material;
   said layer of creped material comprises a liquid repellent compressed creped material;
   said layer of compressed creped material comprises a non-woven material;
   said compressed creped layer of material is a first layer of creped material;
   said covering material comprises a second layer of compressed creped material;
   said compressed creped second layer of material being an originally flat stock;
   said second layer of material comprising a first side and a second side disposed opposite said first side;
   said second side of said second layer of material being disposed against said second side of said substrate to cover said plurality of openings in said substrate;
   said substrate and said second layer both compressed by at least 25% of their original length in a direction opposite a direction of desired extension such that said layer is a creped layer;
   said compressed creped second layer having a plurality of irregular corrugations covering said creped layer;
   said compressed substrate and said first and said second compressed creped layer with corrugations all three being configured to be expandable in the direction of desired extension;
   said compressed substrate and said first and said second compressed creped layer with corrugations all three extending substantially completely across both the width and the length of said roofing material;
   said irregular corrugations covering said second layer having lengths;
   said lengths of said irregular corrugations being smaller than said width of said roofing material;
   the substrate comprises a rib mesh,
   said first layer comprises a polyacrylonitrile non-woven;
   said second layer comprises a polyester non-woven; and
   said substrate comprises aluminum.

2. A roof covering for covering the roof of a building, said covering comprising:
   a substrate;
   said substrate comprising a first side and a second side disposed opposite said first side;
   said substrate comprising a plurality of openings;
   a first layer of material covering a first side of said substrate;
   a second layer of material covering a second side of said substrate;
   said layers of material being from an originally flat stock;
   said first layer of material comprising a first side and a second side disposed opposite said first side;

said second layer of material comprising a first side and a second side disposed opposite said first side;

said first side of said first layer of material being disposed against said first side of said substrate to cover said plurality of openings in said substrate;

said substrate and said first and second layers all compressed by at least 25% of their original length in a direction opposite a direction of desired extension such that said substrate and said first and second layers form a creped layer;

said creped layer comprising a first side and a second side;

said compressed creped layer comprising a plurality of irregular corrugations covering substantially all of said second side of said creped layer;

said compressed creped layer with corrugations being configured to be expandable in the direction of desired extension;

said irregular corrugations having irregular lengths;

said lengths of said irregular corrugations being smaller than said width of said roofing material;

said first layer comprising an air permeable polyacrilonitrile non-woven layer;

the substrate comprising a rib mesh;

said second layer comprising a polyester non-woven; and said substrate comprising aluminum.

3. A roof covering for covering the roof of a building said covering comprising:

an aluminum rib mesh;

said aluminum rib mesh comprising a first side and a second side disposed opposite said first side;

said aluminum rib mesh comprising a plurality of openings;

a first layer of material covering a first side of said substrate comprising a polyester non-woven layer;

a second layer of material covering a second side of said aluminum rib mesh comprising a polyacrilonitrile non-woven layer;

said layers of material and said aluminum rib mesh being formed from originally flat stock;

said aluminum rib mesh, said first layer of material and said second layer of material comprising a compressed creped layer;

said compressed creped layer comprising a plurality of irregular corrugations having irregular lengths and being irregularly spaced from one another; and said lengths of said plurality of irregular corrugations being smaller than the width of said roof covering.

4. The covering material according to claim 3 wherein said first layer of material comprises an air permeable compressed creped material.

5. The covering material according to claim 4 wherein said second layer of material comprises a liquid repellent compressed creped material.

6. The covering material according to claim 5 wherein said compressed creped layer is compressed by at least 25% of its original length in a direction opposite a direction of desired extension.

* * * * *

UNITED STATES PATENT AND TRADEMARK OFFICE
CERTIFICATE OF CORRECTION

PATENT NO. : 6,258,439 B1
DATED : July 10, 2001
INVENTOR(S) : Karl-Heinz Hofmann It is certified that error appears in the above-identified patent and that said Letters Patent is hereby corrected as shown below:

<u>Title page,</u>
Item [57], ABSTRACT,
Line 2, before "and", delete "band" and insert -- hand --.

<u>Column 2,</u>
Line 62, after "preferably", delete "bas" and insert -- has --.

<u>Column 3,</u>
Line 33, after "preferably", delete "bas" and insert -- has --.
Line 58, after "by", delete "band" and insert -- hand --.

Signed and Sealed this

Thirty-first Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,258,439 B1
DATED : July 10, 2001
INVENTOR(S) : Karl-Heinz Hofmann It is certified that error appears in the above-identified patent and that said Letters Patent is hereby corrected as shown below:

Column 3,
Line 61, before "a", delete "bas" and insert -- has --.

Column 5,
Line 4, after "used", delete "witb" and insert -- with --.

Signed and Sealed this

Fourth Day of March, 2003

JAMES E. ROGAN
*Director of the United States Patent and Trademark Office*